United States Patent
Kawabata

Patent Number: 5,342,027
Date of Patent: Aug. 30, 1994

[54] DAMPER POSITION CONTROL DEVICE FOR AUTOMOTIVE AIR CONDITIONING SYSTEM

[75] Inventor: Toshimasa Kawabata, Isesaki, Japan

[73] Assignee: Sanden Corporation, Isesaki, Japan

[21] Appl. No.: 92,522

[22] Filed: Jul. 16, 1993

[30] Foreign Application Priority Data

Jul. 24, 1992 [JP] Japan .................... 4-198050

[51] Int. Cl.$^5$ .......................... F16K 31/02
[52] U.S. Cl. .................... 251/129.13; 236/13; 236/78 C
[58] Field of Search .......... 236/13, 78 C, 49.3; 251/129.13, 129.04; 318/626

[56] References Cited

U.S. PATENT DOCUMENTS

| | | |
|---|---|---|
| 4,611,755 | 9/1986 | Miyanaga et al. ............ 236/13 |
| 4,815,658 | 3/1989 | Hidemitsu et al. |
| 4,834,283 | 5/1989 | Akabane et al. |
| 4,840,308 | 6/1989 | Akabane et al. |
| 4,907,490 | 3/1990 | Taylor et al. |

FOREIGN PATENT DOCUMENTS

| | | |
|---|---|---|
| 0300722 | 1/1989 | European Pat. Off. ......... 236/13 |
| 0167817 | 10/1982 | Japan ..................... 236/13 |
| 0206414 | 12/1983 | Japan ..................... 236/78 C |

*Primary Examiner*—William E. Wayner
*Attorney, Agent, or Firm*—Baker & Botts

[57] ABSTRACT

A damper position control device for use in an automotive air conditioning system. The damper position control device includes a motor actuator which rotates an air mix damper in forward and reverse directions, an electric power source, and an electric power source switch device. The motor actuator includes a motor, a gear which is operatively connected to the drive shaft of the motor and an air mix damper and which rotates the air mix damper in forward and reverse directions in accordance with the rotations thereof, and a rotation control device including a regulator which governs the upper and lower rotational limits of the drive shaft of motor and gear. The regulator includes at least three fixed contacts each of which is parallel to the others, but has the different length, and a movable contact which is in contact with at least two of the fixed contacts and which cycles along fixed contacts in accordance with the rotations of the drive shaft of motor and gear. The rotational angles of the drive shaft of motor and gear, i.e., the operating angles of air mix damper, are regulated by the interaction between the fixed contacts and a movable contact. One or more of the at least three fixed contacts are provided with at least one gap disposed at a fixed position therein. The at least one gap divides the fixed contacts into segments. A corresponding short-circuit switch device alternatively short-circuits or isolates the segments of the fixed contact on either side of each gap.

14 Claims, 4 Drawing Sheets

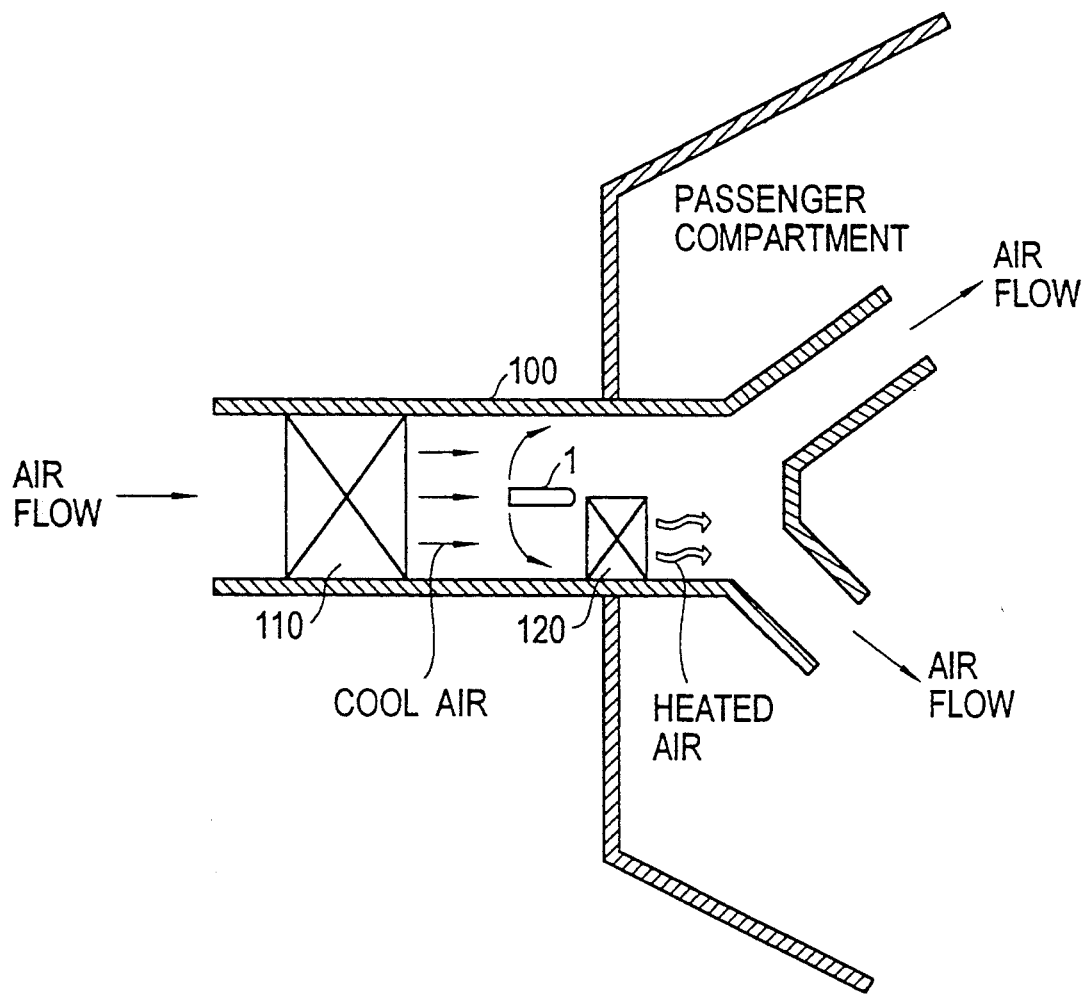

DAMPER POSITION CONTROL DEVICE FOR AUTOMOTIVE AIR CONDITIONING SYSTEM

BACKGROUND OF THE INVENTION

1. Field of the Invention

This invention relates to an automotive air conditioning system, and more particularly, to a damper position control device for an automotive air conditioning system having an angular position control mechanism for a gear of a motor actuator, which regulates the angular position of an air mix damper.

2. Description of the Prior Art

FIG. 1 depicts a schematic view of a damper position control device used for an automotive air conditioning system. Air mix damper 1 is disposed between an evaporator and a heater core in a flow channel in which air flows in a path (not shown) from evaporator (not shown) past air mix damper 1 and to heater core (not shown). Air mix damper 1 controls the volume of air which flows to the heater core as a function of its angular position and, thereby, controls the temperature of the air in the flow channel. The damper position control device includes an electric power source 2, an electric power source switch device 3, and a motor actuator 4 which is operatively connected to air mix damper 1 through a wire or link and which varies the angular position of air mix damper 1.

Motor actuator 4 comprises a motor 41, a gear 42 connected to the drive shaft of motor 41, and a rotation control device 43 which controls the drive shaft of motor 41 and gear 42. Gear 42 is operatively connected to air mix damper 1 through a wire or link. Rotation control device 43 includes a regulator 44 which regulates the upper and lower rotational limits of gear 42.

Regulator 44 includes a movable contact 441 and fixed contacts 442a, 442b, and 442c. Movable contact 441 is rotationally driven in accordance with the rotation of the drive shaft of motor 41 and gear 42, and fixed contacts 442a, 442b, and 442c are in contact with movable contact 441. Fixed contacts 442a, 442b, and 442c are resistance elements disposed parallel to each other. Fixed contacts 442b and 442c are shorter than fixed contact 442a, and are disposed, so that they may be offset to the right and left, respectively. The upper and lower rotational limits of gear 42 are governed by the connections between fixed contacts 442b and 442c and movable contact 441. Fixed contacts 442b and 442c are coupled with motor 41 through diodes 45a and 45b, which have opposite polarities. Fixed contact 442a is coupled directly with electric power source switch device 3.

Switch device 3 includes switches 31 and 32 which are moveable, so that they may be linked together. Switch 31 comprises a movable contact 311 which is coupled with fixed contacts 442b and 442c through motor 41, and terminals 312a and 312b which may be brought into contact with movable contact 311 and, thereby, coupled with the positive and negative poles of electric power source 2, respectively. Switch 32 comprises a movable contact 321 which is coupled with fixed contact 442a, and terminals 322a and 322b which may be brought into contact with movable contact 321 and, thereby, coupled with the negative and positive poles of electric power source 2, respectively.

The damper position control device, discussed above, operates according to the following description. If movable contact 441 is initially positioned, such that it is in contact with the right end portions of fixed contacts 442a and 442b, as shown by the thatched, solid-line representation of contact 441, when movable contacts 311 and 321 are brought into contact with terminals 312a and 322a, respectively; electric current flows to motor 41 from electric power source 2 through fixed contacts 442a and 442b and movable contact 441. For example, terminals 312a and 322a may be brought into contact with contacts 311 and 321, respectively, by signals generated from a temperature control device and may be based on a predetermined temperature, an outside temperature, and a temperature inside an automobile passenger compartment. The drive shaft of motor 41 and gear 42 may rotate forward in response to the supply of electric current to motor 41. Air mix damper 1 is rotated forward in accordance with the rotation of gear 42. Moreover, movable contact 441 moves left along fixed contacts 442a and 442b, as shown by arrow A, in accordance with the rotation of gear 42. Thus, air mix damper 1 rotates and movable contact 441 moves during the rotation of gear 42.

Movable contact 441 is no longer in contact with the left end portion of fixed contact 442b when movable contact 441 reaches the left end portions of fixed contacts 442a and 442c. The final position of contact 441 is indicated by the broken-line representation of movable contact 441. Accordingly, the supply of electric current to motor 41 is cut off when the connection between movable contact 441 and fixed contact 442b is severed. When this connection is severed, the rotations of the drive shaft of motor 41 and gear 42 cease. Air mix damper 1 also stops at a fixed angular position in response to the cessation of the rotation of gear 42.

On the other hand, if movable contact 441 is initially positioned, so that it is in contact with the left end portions of fixed contacts 442a and 442c, as shown by the broken-line representation, when movable contacts 311 and 321 are brought into contact with terminals 312b and 322b, respectively, by signals generated by a temperature control device based on a predetermined temperature, an outside temperature, and an inside temperature; electric current flows to motor 41 from electric power source 2 through fixed contacts 442a and 442c and movable contact 441. When contact 441 is in this position, the drive shaft of motor 41 and gear 42 rotate in the opposite direction when electric current is supplied to motor 41. Air mix damper 1 also rotates in the opposite direction in accordance with the rotation of gear 42. Moreover, movable contact 441 moves right along fixed contacts 442a and 442c, as shown by arrow B, in accordance with the rotation of gear 42. Thus, air mix damper 1 rotates and movable contact 441 moves during the rotation of gear 42.

Movable contact 441 is no longer in contact with the right end portion of fixed contact 442c when movable contact 441 reaches the right end portions of fixed contacts 442a and 442b, as shown by the thatched, solid-line representation. Accordingly, the supply of electric current to motor 41 is cut off when the connection between movable contact 441 and fixed contact 442c is severed. When this connection is severed, the rotations of the drive shaft of motor 41 and gear 42 cease. Air mix damper 1 also stops at the fixed angular position in response to the cessation of the rotation of gear 42.

Thus, in the damper position control device, described above, the operating angles of air mix damper 1 are determined by the length and the position of fixed contacts 442b and 442c. Nevertheless, each of fixed contacts 442b and 442c can determine only one operating angle of air mix damper 1, and if it is necessary to increase the number of operating angles of air mix damper 1, the number of fixed contacts may have to be increased. Accordingly, regulator 44 and, therefore, damper position control device may become larger, heavier, and more complicated in order to increase the operating angles of air mix damper 1.

SUMMARY OF THE INVENTION

It is an object of this invention to provide a damper position control device for use in an automotive air conditioning system which provides a greater range of operating angles of an air mix damper regardless of the quantity of fixed contacts.

It is another object of this invention to provide a damper position control device for use in an automotive air conditioning system which can achieve the optimum temperature control in the passenger compartment in accordance with a predetermined temperature, an outside temperature, and an inside temperature, regardless of the quantity of fixed contacts.

A damper position control device for an automotive air conditioning system according to this invention controls the angular position of an air mix damper. The air mix damper controls the mixture of cool air and heated air and, thereby, controls the temperature of air blown into a passenger compartment by the automotive air conditioning system. The damper position control device includes a motor actuator which is capable of rotating the air mix damper in forward and reverse directions and an electric power source and an electric power source switch device. The motor actuator includes a motor, a gear operatively connected to the drive shaft of the motor, and a rotation control device including a regulator which governs the upper and lower rotational limits of the drive shaft of the motor and gear. The gear is operatively connected to the air mix damper and is capable of rotating the air mix damper in forward and reverse directions into a plurality of operating angles in accordance with the forward and reverse rotation of the gear.

The regulator includes three or more fixed contacts which are parallel to each other and have different lengths, and a movable contact which is in contact with two or more of the fixed contacts. The movable contact moves along the fixed contacts in response to the rotations of the drive shaft of the motor and gear. Electric power source switch device may be activated by signals generated from a temperature control device based on a predetermined temperature, an outside temperature, and an inside temperature. The switch permits the electric current to flow from the electric power source to the motor through the movable contact and the fixed contacts. The rotational angles of the drive shaft of the motor and gear, e.g., the driving angles of the air mix damper, are regulated by the connections between fixed contacts and movable contact. The improvement of the present invention comprises the addition of at least one gap disposed at a fixed position in the fixed contacts and dividing the fixed contacts into segments. Moreover, each of the one or more gaps further comprises a short-circuit switch device which alternatively short-circuits the gap or isolates the segments of the fixed contact on either side of the gap.

Other objects, advantages, and features will be apparent when the detailed description of preferred embodiments of the invention and the drawings are considered.

BRIEF DESCRIPTION OF THE DRAWINGS

FIG. 2C depicts a schematic view of an automotive air conditioning system in accordance with this invention.

FIG. 3 depicts a table showing the relationship between the movement of short-circuit switch devices and the changes of the operating angles of an air mix damper of an automotive air conditioning system including a damper position control device as depicted in FIG. 2A.

DETAILED DESCRIPTION OF THE PREFERRED EMBODIMENTS

Figure 1:
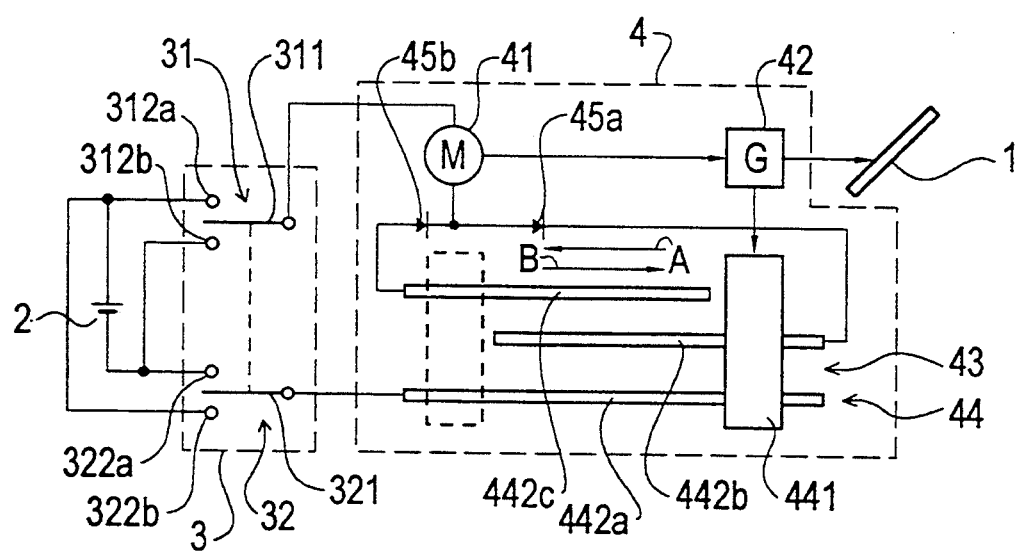
FIG. 1 depicts a schematic view of a damper position control device for use in an automotive air conditioning system in accordance with the prior art.
Figure 2A:
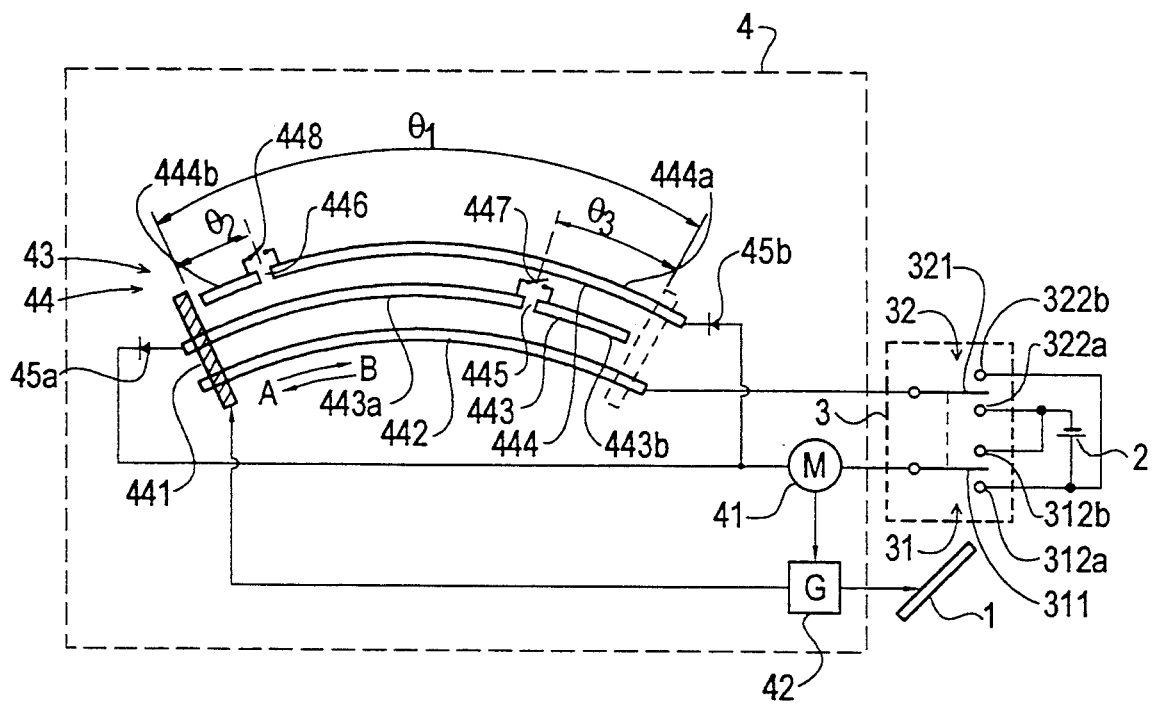
FIG. 2A depicts a schematic view of a damper position control device for use in an automotive air conditioning system in accordance with a first embodiment of this invention.
Figure 2B:
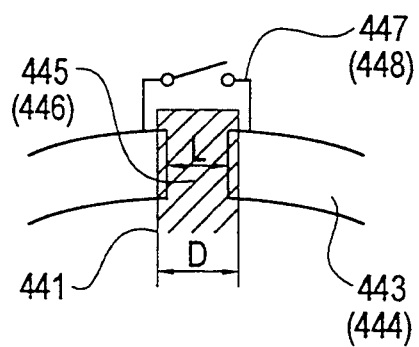
FIG. 2B depicts an enlarged view of a gap including a short-circuit switch device of a damper position control device as depicted in FIG. 2A.

FIGS. 2A and 2B depict a first embodiment of a damper position control device for use in an automotive air conditioning system in accordance with this invention. Referring to FIG. 2C, air mix damper 1 is disposed between evaporator 110 and heater core 110 in a flow channel 100 in which air flows in a path from evaporator past air mix damper 1 and heater core. Air mix damper 1 controls the volume of air which flows to heater core as a function of its angular position and, thereby, controls the temperature of the air exiting the flow channel. The damper position control device includes an electric power source 2, an electric power source switch device 3, and a motor actuator 4 which is operatively connected to air mix damper 1 through a wire or link to vary the angular position of air mix damper 1.

Motor actuator 4 comprises a motor 41, a gear 42 connected to the drive shaft of motor 41, and a rotation control device 43 which controls the drive shaft of motor 41 and gear 42. Gear 42 is operatively connected to air mix damper 1 through a wire or link. Rotation control device 43 includes regulator 44 which regulates the upper and lower rotational limits of the drive shaft of motor 41 and gear 42.

Regulator 44 includes a movable contact 441 and fixed contacts 442, 443, and 444. Movable contact 441 is driven along fixed contacts 442, 443, and 444 in accordance with the rotation of drive shaft of motor 41 and gear 42, and fixed contacts 442, 443, and 444 are in contact with movable contact 441. Fixed contacts 442, 443, and 444 are resistance elements which may be arc-shaped and extend parallel to each other.

Fixed contacts 443 and 444 are shorter than fixed contact 442 and are disposed, so that they may be offset to the left and right, respectively. Fixed contact 443 is provided with a gap 445 which splits fixed contact 443 into fixed contact segments 443a and 443b. The right end portion of fixed contact 443a and the left end portion of fixed contact 443b are connected to each other by a short-circuit switch 447 which alternatively short-circuits or isolates the segments on either side of gap 445. Fixed contact 444 is provided with a gap 446 which splits fixed contact 444 into fixed contact segments 444a and 444b. The left end portion of fixed contact 444a and the right end portion of fixed contact 444b are connected to each other by a short-circuit switch 448 which alternatively short-circuits or isolates the segments on either side of gap 446. The widths of gaps 445 and 446 are smaller than the width of movable contact 441, as shown in FIG. 2B. The upper and lower rotational limits of the drive shaft of motor 41 and gear 42 are governed by the connections between fixed contacts 443 and 444 and movable contact 441. Fixed contacts 443 and 444 are coupled with motor 41 through diodes 45a and 45b which have opposite polarities.

Fixed contact 442 is coupled directly with switch device 3. For example, short-circuit switches 447 and 448 are operated by the operating control devices (not shown) on a control panel (not shown) for an automotive air conditioning system disposed inside of the automobile passenger compartment. Passengers can alternatively open or close short-circuit switches 447 and 448 by manual operation of control devices according to a plurality of modes of operation for an automotive air conditioning system.

Switch device 3 includes switches 31 and 32 which may be shifted, so that they may be linked together. Switch 31 comprises a movable contact 311, which is coupled with fixed contacts 443 and 444 through motor 41, and terminals 312a and 312b, which are alternatively in contact with movable contact 311 and which are respectively coupled with the positive and negative poles of electric power source 2. Switch 32 comprises a movable contact 321, which is coupled with fixed contact 442, and terminals 322a and 322b, which are alternatively in contact with movable contact 321 and which are respectively coupled with the negative and positive poles of electric power source 2.

The damper position control device, described above, operates as follows. If both short-circuit switches 447 and 448 are closed and movable contact 441 is initially positioned, so that it is in contact with the left end portions of fixed contacts 442 and 443, as depicted by the thatched, solid-line representation, when movable contacts 311 and 321 are brought into contact with terminals 312a and 322a, respectively, by signals generated from a temperature control device based a predetermined temperature, an outside temperature, and an inside temperature; electric current flows to motor 41 from electric power source 2 through fixed contacts segments 442 and 443 and movable contact 441. The drive shaft of motor 41 and gear 42 rotates forward in response to the supply of electric current. Air mix damper 1 rotates in the forward direction in accordance with the rotation of gear 42. Moreover, movable contact 441 moves right along fixed contacts 442 and 443, as shown by arrow A, in accordance with the rotation of gear 42. Air mix damper 1 rotates and movable contact 441 moves during the rotation of gear 42.

Movable contact 441 is no longer in contact with the right end portion of fixed contact 443 when movable contact 441 reaches the right end portions of fixed contacts 442 and 444, as shown by the broken-line representation. Accordingly, the supply of electric current to motor 41 is cut off due to the severance of the connection between movable contact 441 and fixed contact 443, and the rotations of the drive shaft of motor 41 and gear 42 cease. Air mix damper 1 also stops at the fixed angular position in response to the cessation of the rotation of gear 42.

On the other hand, if movable contact 441 is initially positioned, so that it is in contact with the right end portions of fixed contacts 442 and 444, as depicted by the broken-line representation, when movable contacts 311 and 321 are brought into contact with terminals 312b and 322b, respectively, by signals generated from a temperature control device based on a predetermined temperature, an outside temperature, and an inside temperature; electric current flows to motor 41 from electric power source 2 through fixed contacts 442 and 444 and movable contact 441. The drive shaft of motor 41 and gear 42 rotates in the opposite direction due to the reversed polarity of the supply of electric current. Air mix damper 1 now rotates in the opposite direction in accordance with the rotation of gear 42. Moreover, movable contact 441 moves left along fixed contacts 442 and 444, as shown by arrow B, in accordance with the rotation of gear 42. Air mix damper 1 rotates and movable contact 441 moves left during the rotation of gear 42.

The right side of movable contact 441 is no longer in contact with the left end portion of fixed contact 444 when movable contact 441 reaches the left end portions of fixed contacts 442 and 443, as depicted by the thatched, solid-line representation. Accordingly, the supply of electric current to motor 41 is cut off due to the severance of connection between movable contact 441 and fixed contact 444, and the rotations of the drive shaft of motor 41 and gear 42 cease. Air mix damper 1 also stops at the fixed angular position in response to the cessation of the rotation of gear 42.

If the central angle between the right and left end portions of fixed contacts 443 and 444 is fixed at $\theta_1$, as depicted, in FIG. 2A, when both short-circuit switches 447 and 448 are closed, movable contact 441 cycles within the range between the left end portions of fixed contacts 442 and 443 and the right end portions of fixed contacts 442 and 444. Accordingly, the driving angle of movable contact 441, i.e., the operating angle of air mix damper 1, is regulated at about $\theta_1$.

The angular width D of movable contact 441 must be larger than the width L of gaps 445 and 446, as depicted in FIG. 2B. If the angular width D were smaller than the width L, when movable contact 441 passes through gaps 445 and 446, all contact between movable contact 441 and fixed contacts 443 and 444 would be broken when movable contact 441 enters into gaps 445 and 446. Accordingly, electric current would be cut off, and the rotations of the drive shaft of motor 41 and gear 42 cease. Thus, air mix damper 1 also would stop rotating while contact 441 is in gaps 445 and 446. If the angular width D is larger than the width L, when movable contact 441 passes through gaps 445 and 446, at least one side of movable contact 441 is continually in contact with fixed contacts 443 or 444, or both. Accordingly, electric current is not cut off, and the drive shaft of motor 41 and gear 42 continues to rotate, and air mix damper 1 also continues to rotate.

If both short-circuit switches 447 and 448 are open and movable contact 441 is initially positioned in gap 446, when movable contacts 311 and 321 are brought into contact with terminals 312a and 322a, respectively, by signals generated from a temperature control device based a predetermined temperature, an outside temperature, and an inside temperature; electric current flows to motor 41 from electric power source 2 through fixed contact 442 and fixed contact segment 443a and movable contact 441. The drive shaft of motor 41 and gear 42 rotate forward due to the supply of electric current. Air mix damper 1 rotates in the forward direction in accordance with the rotation of gear 42. Moreover, movable contact 441 moves right along fixed contact 442 and segment 443a, as shown by arrow A, in accordance with the rotation of gear 42. Air mix damper 1 rotates and movable contact 441 moves during the rotation of gear 42.

When the left side of movable contact 441 is no longer in contact with the right end portion of segment 443a and enters into gap 445, the supply of electric current to motor 41 is cut off by the severance of the connection between movable contact 441 and segment 443a. Accordingly, the rotation of drive shaft of motor 41 and gear 42 cease, and air mix damper 1 also stops at the fixed angular position in response to the cessation of the rotation of gear 42.

On the other hand, if movable contact 441 is initially positioned in gap 445, when movable contact 311 and 321 are brought into contact with terminals 312b and 322b, respectively, by signals generated from a temperature control device based on a predetermined temperature, an outside temperature, and an inside temperature; electric current flows to motor 41 from electric power source 2 through fixed contact 442 and segment 443a and movable contact 441. The drive shaft of motor 41 and gear 42 rotate in the opposite direction due to the reversed polarity of supply of electric current. Air mix damper 1 also rotates in the opposite direction in accordance with the rotation of gear 42. Moreover, movable contact 441 moves left along fixed contact 442 and segment 443a, as shown by arrow B, in accordance with the rotation of gear 42. Air mix damper 1 rotates and movable contact 441 moves during the rotation of gear 42.

When the right side of movable contact 441 is no longer in contact with the left end portion of fixed contact segment 444a and enters into gap 446, the supply of electric current to motor 41 is cut off by the severance of the connection between movable contact 441 and segment 444a. Accordingly, the rotations of drive shaft of motor 41 and gear 42 cease, and air mix damper 1 also stops at the fixed angular position in response to the cessation of the rotation of gear 42.

If the central angle between the left end portion of fixed contact segment 444b and the central portion of gap 446 is fixed at $\theta_2$ and the central angle between the right end portion of segment 443b and the central portion of gap 445 is fixed at $\theta_3$, as shown in FIG.2A, when short-circuit switches 447 and 448 are open, movable contact 441 cycles within the range between gaps 445 and 446. Accordingly, the driving angle of movable contact 441, i.e., the operating angle of air mix damper 1, is regulated at about $\theta_1-\theta_2-\theta_3$.

If short-circuit switch 448 is closed and short-circuit switch 447 is open and movable contact 441 is initially positioned, so that it is in contact with the left end portions of fixed contact 442 and fixed contact segment 443a, when movable contacts 311 and 321 are brought into contact with terminals 312b and 322b, respectively, by signals generated from a temperature control device based on a predetermined temperature, an outside temperature, and an inside temperature; electric current flows to motor 41 from electric power source 2 through fixed contact 442 and segment 443a and movable contact 441. The drive shaft of motor 41 and gear 42 rotates forward due to the reversed polarity of the supply of electric current. Air mix damper 1 also rotates in the rotates forward in accordance with the rotation of gear 42. Moreover, movable contact 441 moves right along fixed contact 442 and segment 443a, as shown by arrow A, in accordance with the rotation of gear 42. Air mix damper 1 rotates and movable contact 441 moves during the rotation of gear 42.

When the left side of movable contact 441 is no longer in contact with the right end portion of segment 443a and enters into gap 445, the supply of electric current to motor 41 is cut off due to the severance of the connection between movable contact 441 and segment 443a. Accordingly, the rotations of the drive shaft of motor 41 and gear 42 cease, and air mix damper 1 stops at the fixed angular position in response to the cessation of the rotation of gear 42.

On the other hand, when movable contact 441 is initially positioned in gap 445 and movable contacts 311 and 321 are brought into contact with terminals 312a and 322a, respectively, by signals generated from a temperature control device based a predetermined temperature an outside temperature, and an inside temperature; electric current flows to motor 41 from electric power source 2 through fixed contacts 442 and 444 and movable contact 441. The drive shaft of motor 41 and gear 42 rotates in the opposite direction due to the reversed polarity of the supply of electric current. Air mix damper 1 also rotates in the opposite direction in accordance with the rotation of gear 42. Moreover, movable contact 441 moves left along fixed contacts 442 and 444, as shown by arrow B, in accordance with the rotation of gear 42. Air mix damper 1 rotates and movable contact 441 moves during the rotation of gear 42.

When the right side of movable contact 441 is no longer in contact with the left portion of fixed contact 444 and reaches to left end portions of fixed contacts 442 and 443, the supply of electric current to motor 41 is cut off by the severance of the connection between movable contact 441 and fixed contact 444. Accordingly, the rotations of the drive shaft of motor 41 and gear 42 cease, and air mix damper 1 stops at the fixed angular position response to the cessation of the rotation of gear 42.

As explained above, when short-circuit switch 448 is closed and short-circuit switch 447 is open, movable contact 441 cycles within a range between the left end portions of fixed contacts 442 and 443 and gap 445. Accordingly, the driving angle of movable contact 441, i.e., the operating angle of air mix damper 1, is regulated at about $\theta_1-\theta_3$.

If short-circuit switch 447 is closed and short-circuit 448 is open and the movable contact 441 is initially positioned in gap 446, when movable contacts 311 and 321 are brought into contact with terminals 312b and 322b, respectively, by signals generated from a temperature control device based on a predetermined temperature, an outside temperature, and an inside temperature; electric current flows to motor 41 from electric power source 2 through fixed contacts 442 and 443 and movable contact 441. The drive shaft of motor 41 and gear 42 rotate forward due to the supply of electric current. Air mix damper 1 rotates forward in accordance with the rotation of gear 42. Moreover, movable contact 441 moves right along fixed contacts 442 and 443, as shown by arrow A, in accordance with the rotation of gear 42. Air mix damper 1 rotates and movable contact moves during the rotation of gear 42.

When the left side of movable contact 441 is no longer in contact with the right end portion of fixed contact 443 and reaches the right end portions of fixed contacts 442 and 444, the supply of electric current to motor 41 is cut off due to the severance of the connection between movable contact 441 and fixed contact segment 443a. Accordingly, the rotations of the drive shaft of motor 41 and gear 42 ceases, and air mix damper 1 also stops at the fixed angular position in response to the cessation of the rotation of gear 42.

On the other hand, if movable contact 441 is initially positioned at the right end portions of fixed contact 442 and fixed contact segment 444a, when movable contacts 311 and 321 are brought into contact with terminals 312a and 322a, respectively, by signals generated from a temperature control device based a predetermined temperature, an outside temperature, and an inside temperature; electric current flows to motor 41 from electric power source 2 through fixed contact 442 and segment 444a and movable contact 441. The drive shaft of motor 41 and gear 42 rotate in the opposite direction due to the reversed polarity of the supply of electric current. Air mix damper 1 rotates in the opposite direction in accordance with the rotation of gear 42. Moreover, movable contact 441 moves left along fixed contacts 442 and segment 444a, as shown by arrow B, in accordance with the rotation of gear 42. Air mix damper 1 rotates and movable contact 441 moves during the rotation of gear 42.

When the right side of movable contact 441 is no longer in contact with the left end portion of segment 444a and enters into gap 446, the supply of electric current to motor 41 is cut off by the severance of the connection between movable contact 441 and segment 444a. Accordingly, the rotations of the drive shaft of motor 41 and gear 42 cease, and air mix damper 1 also stops at the fixed angular position in response to the cessation of the rotation of gear 42.

As explained above, when short-circuit switch 447 is closed and short-circuit switch 448 is open, movable contact 441 cycles within the range between the right end portions of fixed contacts 442 and 444 and gap 446. Accordingly, the driving angle of movable contact 441, i.e., the operating angle of air mix damper 1, is regulated at about $\theta_1$-$\theta_2$.

Further, even if the driving angles of movable contact 441 are fixed at $\theta_1$, $\theta_2$, and $\theta_3$, as depicted in FIG. 2A; movable contact 441 must be completely out of contact with fixed contacts 443 and 444, so as to cut off the electric current supplied to motor 41 and to stop the rotations of the drive shaft of motor 41 and gear 42. Accordingly, the precise driving angles of movable contact 441, i.e., the precise operating angles of air mix damper 1, may be slightly different from the fixed angles $\theta_1$, $\theta_2$, and $\theta_3$. Nevertheless, for practical purposes, these differences may be ignored in a general automotive air conditioning system.

FIG. 3 depicts the relation between the position of short-circuit switches 447 and 448 and the changes of the operating angles of air mix damper 1 in accordance with the first embodiment as depicted in FIGS. 2A and 2B. Referring to FIG. 3, when both of short-circuit switches 447 and 448 are closed, the operating angle of air mix damper 1 is regulated at about $\theta_1$. When both of short-circuit switches 447 and 448 are open, the operating angle is regulated about $\theta_1$-$\theta_2$-$\theta_3$. When short-circuit switch 447 is closed and short-circuit 448 is open, the operating angle is regulated at about $\theta_1$-$\theta_2$. When short-circuit switch 447 is open and short-circuit switch 448 is closed, the operating angle is regulated at about $\theta_1$-$\theta_3$. Thus, because of gaps 445 and 446 and short-circuit switches 447 and 448, four operating angles of air mix damper 1 can be defined. Further, if fixed contacts 443 and 444 are provided with more gaps and short-circuit switches, a greater number of operating angles can be defined.

Figure 4:
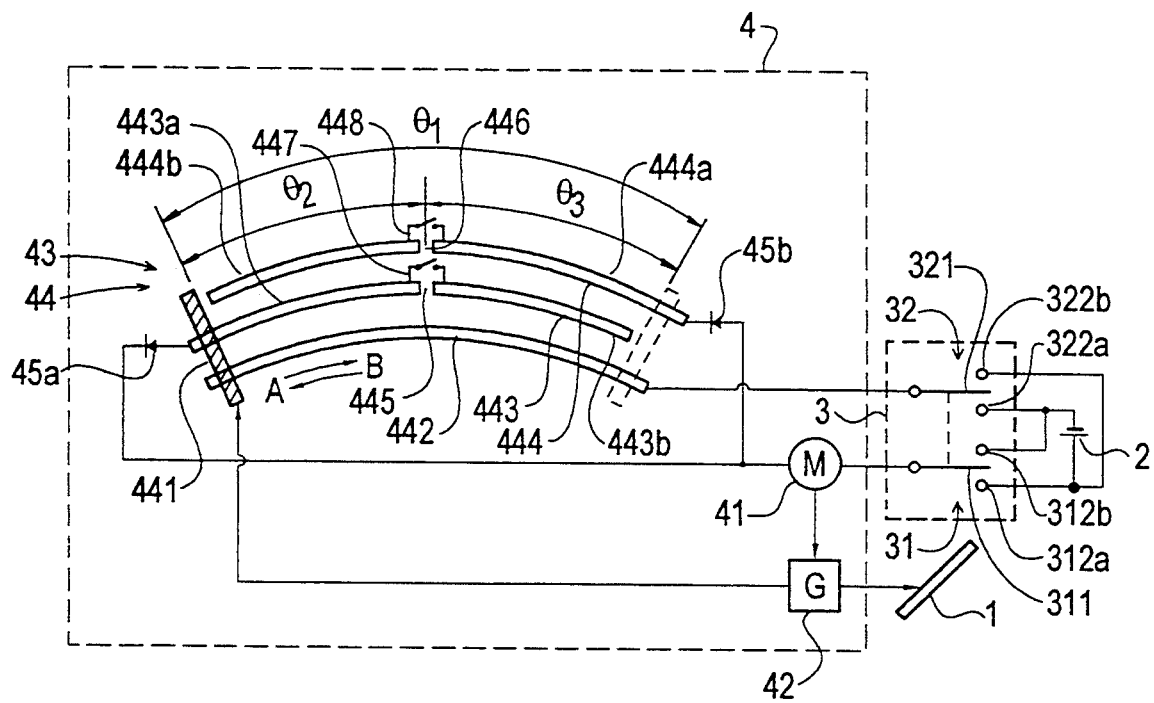
FIG. 4 depicts a schematic view of a damper position control device for use in an automotive air conditioning system in accordance with a second embodiment of this invention.

FIG. 4 depicts a second embodiment of a damper position control device used for an automotive air conditioning system in accordance with this invention. The same numerals are used in FIG. 4 to denote the corresponding elements depicted in FIGS. 2A and 2B, but an explanation thereof is omitted.

Referring to FIG. 4, fixed contacts 443 and 444 are shorter than fixed contact 442 and are disposed, so that they may be offset to the left and right, respectively. Fixed contact 443 is provided with a gap 445 which splits fixed contact 443 into fixed contact segments 443a and 443b. The right end portion of fixed contact segment 443a and the left end portion of fixed contact segment 443b are connected to each other by a short-circuit switch 447 which may alternatively short-circuit or isolate the segments on either side of gap 445. Fixed contact 444 is provided with a gap 446 which splits fixed contact 444 into fixed contact segments 444a and 444b. The left end portion of fixed contact segment 444a and the right end portion of fixed contact 444b are connected to each other by a short-circuit switch 448 may which alternatively short-circuit or isolate the segments on either side of gap 446. The widths of gaps 445 and 446 are shorter than the width of movable contact 441, as depicted in FIG. 2B. The upper and lower rotational limits of gear 42 are governed by the connections between fixed contacts 443 and 444 and movable contact 441. The left end portion of fixed contact 443 and the right end portion of fixed contact 444 are respectively coupled with motor 41 through diodes 45a and 45b which have opposite polarities. Fixed contact 442 is coupled directly with electric power source switch device 3. The central angle between the right end portion of fixed contact 443 and the left end portion of fixed contact 444 is fixed at about $\theta_1$. Gaps 445 and 446 are disposed, so that the central angle between the left end portion of fixed contact 444 (or the right end portion of fixed contact 443) and the central portion of gap 445 is about the same size as the central angle between the left end portion of fixed contact 444 (or the right end portion of fixed contact 443) and the central portion of gap 446, e.g., $\theta_2$=$\theta_3$.

The damper position control device, discussed above, operates as follows. If both of short-circuit switches 447 and 448 are closed and movable contact 441 is initially positioned so as to be in contact with the left end portions of fixed contacts 442 and 443, as shown by the thatched, solid-line representation, when movable contacts 311 and 321 are brought into contact with terminals 312b and 322b, respectively, by signals generated from a temperature control device based on a predetermined temperature, an outside temperature, and an inside temperature; electric current flows to motor 41 from electric power source 2 through fixed contacts 442 and 443 and movable contact 441. The drive shaft of motor 41 and gear 42 rotate forward in response to the supply of electric current. Air mix damper 1 rotates in a forward direction in accordance with the rotation of gear 42. Moreover, movable contact 441 moves right along fixed contacts 442 and 443, as shown by arrow A, in accordance with the rotation of gear 42. Air mix damper 1 rotates and movable contact 441 moves during the rotation of gear 42.

The left side of movable contact 441 is no longer in contact with the right end portion of fixed contact 443 when movable contact 441 reaches the right end portions of fixed contacts 442 and 444, as shown by the broken-line representation. Accordingly, the supply of electric current to motor 41 is cut off due to the severance of the connection between movable contact 441 and fixed contact 443, and the rotations of the drive shaft of motor 41 and gear 42 cease. Air mix damper 1 stops at the fixed angular position in response to the cessation the rotation of gear 42.

On the other hand, if movable contact 441 is initially positioned, so that it is in contact with the right end portions of fixed contacts 442 and 444, as shown by a broken-line representation, when movable contacts 311 and 321 are brought into contact with terminals 312b and 322b, respectively, by signals generated from a temperature control device based on a predetermined temperature, an outside temperature, and an inside temperature; electric current flows to motor 41 from electric power source 2 through fixed contacts 442 and 444 and movable contact 441. The drive shaft of motor 41 and gear 42 rotate in the opposite direction in response to the reversed polarity of the supply of electric current. Air mix damper 1 rotates in the opposite direction in accordance with the rotation of gear 42. Moreover, movable contact 441 moves left along fixed contacts 442 and 444, as shown by arrow B, in accordance with the rotation of gear 42. Air mix damper 1 rotates and movable contact 441 moves during the rotation of gear 42.

The right side of movable contact 441 no longer is in contact with the left end portion of fixed contact 444 when movable contact 441 reaches the left end portions of fixed contacts 442 and 443, as shown by the thatched, solid-line representation. Accordingly, the supply of electric current to motor 41 is cut off due to the severance of the connection between movable contact 441 and fixed contact 444, and the rotation of drive shaft of motor 41 and gear 42 cease. Air mix damper 1 also stops at the fixed angular position in response to the cessation of the rotation of gear 42.

As explained above, when both of short-circuit switches 447 and 448 are closed, movable contact 441 cycles within the range between the right end portion of fixed contacts 442 and 444 and the left end portions of fixed contacts 442 and 443. Accordingly, the driving angle of movable contact 441, i.e., the operating angle of air mix damper 1, is regulated at about $\theta_1$. For example, if the positions of movable contact 441, as shown by solid and broken-line representations in FIG. 4, indicate the outside air introduction and the passenger compartment air recirculation modes, respectively motor actuator 4 can alternatively control air mix damper 1, so that automotive air conditioning system operates in the outside air introduction mode or the passenger compartment air recirculation mode.

If short-circuit switch 448 is closed and short-circuit switch 447 is open and movable contact 441 is initially positioned, so that it is in contact with the left end portions of fixed contact 442 and fixed contact segment 443a, when movable contacts 311 and 321 are brought into contact with terminals 312b and 322b, respectively, by signals generated from a temperature control device based on a predetermined temperature, an outside temperature, and an inside temperature; electric current flows to motor 41 from electric power source 2 through fixed contact 442 and fixed contact segment 443a and movable contact 441. The drive shaft of motor 41 and gear 42 rotate forward in response to the supply of electric current. Air mix damper 1 rotates in the forward direction in accordance with the rotation of gear 42. Moreover, movable contact 441 moves right along fixed contact 442 and segment 443a, as shown by arrow A, in accordance with rotation of gear 42. Air mix damper 1 rotates and movable contact 441 moves during the rotation of gear 42.

When the left side of movable contact 441 is no longer in contact with the right end portion of segment 443a and enters into gap 445, the supply of electric current to motor 41 is cut off due to the severance of the connection between movable contact 441 and segment 443a. Accordingly, the rotations of the drive shaft of motor 41 and gear 42 cease, and air mix damper 1 also stops at the fixed angular position in response to the cessation of the rotation of gear 42.

On the other hand, when movable contact 441 is initially positioned in gap 445 when movable contacts 311 and 321 are brought into contact with terminals 312a and 322a, respectively, by signals generated from a temperature control device based on a predetermined temperature, an outside temperature, and an inside temperature; electric current flows to motor 41 from electric power source 2 through fixed contacts 442 and 444 and movable contact 441. The drive shaft of motor 41 and gear 42 rotates in the opposite direction due to the reversed polarity of the supply of electric current. Moreover, movable contact 441 moves left along fixed contacts 442 and 444, as shown by arrow B, in accordance with the rotation of gear 42. Air mix damper 1 rotates in the opposite direction, and movable contact 441 moves during the rotation of gear 42.

When the right side of movable contact 441 is no longer in contact with the left end portion of fixed contact 444 and reaches to the left end portions of fixed contact 442 and fixed contact segment 443a, the supply of electric current to motor 41 is cut off due to the severance of the connection between movable contact 441 and fixed contact 444. Accordingly, the rotations of the drive shaft of motor 41 and gear 42 cease. Air mix damper 1 also stops at the fixed angular position in response to the cessation of the rotation of gear 42.

As explained above, when short-circuit switch 448 is closed and short-circuit switch 447 is open, movable contact 441 cycles within a range between the left end portion of fixed contact 444 and gap 445. Accordingly, the driving angle of movable contract 441, i.e., the operating angle of air mix damper 1, is regulated at about $\theta_2$. For example, if the position of movable contact 441, as shown by the thatched, solid-line representation in FIG. 4, indicates the outside air introduction mode and the position of movable contact 441 positioned in gap 445 indicates the mixture of outside air and inside air mode, motor actuator 4 can alternatively control air mix damper 1, so that the automotive air conditioning system operates in the outside air introduction mode or the mixture of outside and inside air mode.

If short-circuit switch 447 is closed and short-circuit switch 448 is open and movable contact 441 is initially positioned, so that it is in contact with the right end portion of fixed contact 442 and fixed contact segment 444a, as shown by the broken-line representation, when movable contact 311 and 321 are brought into contact with terminals 312a and 322a, respectively, by signals generated from a temperature control device based on a predetermined temperature, an outside temperature, and an inside temperature; electric current flows to motor 41 from electric power source 2 through fixed contract 442 and segment 444a and movable contact 441. The drive shaft of motor 41 and gear 42 rotates forward in response to the supply of electric current. Air mix damper 1 rotates forward in accordance with the rotation of gear 42. Moreover, movable contact 441 moves left along fixed contract 442 and segment 444a, as shown by arrow B, in accordance with the rotation of gear 42. Air mix damper 1 rotates and movable contact 441 moves during the rotation of gear 42.

When the right side of movable contact 441 is no longer in contact with the left end portion of fixed contact segment 444a and enters into gap 446, the supply of electric current to motor 41 is cut off due to the severance of the connection between movable contact 441 and contact segment 444a. Accordingly, the rotations of the drive shaft of motor 41 and gear 42 cease, and air mix damper 1 also stops at the fixed angular position in response to the cessation of the rotation of gear 42.

On the other hand, when movable contact 441 is initially positioned in gap 446 and movable contacts 311 and 321 are brought into contact with terminals 312b and 322b, respectively, by signals generated from a temperature control device based on a predetermined temperature, an outside temperature, and an inside temperature; electric current flows to motor 41 from electric power source 2 through fixed contacts 442 and 443 and movable contact 441. The drive shaft of motor 41 and gear 42 rotates in the opposite direction due to the reversed polarity of the supply of electric current. Air mix damper 1 rotates in the opposite direction in accordance with the rotation of gear 42. Moreover, movable contact 441 moves right along fixed contact 442 and 443, as shown by arrow A, in accordance with the rotation of gear 42. Air mix damper 1 rotates and movable contact 441 moves during the rotation of gear 42.

When the left side of movable contact 441 is no longer in contact with the right end portion of fixed contact 443 and movable contact 441 reaches the right end portions of fixed contacts 442 and 444, the supply of electric current to motor 41 is cut off due to the severance of the connection between movable contact 441 and fixed contact 443. Accordingly, the rotations of the drive shaft of motor 41 and gear 42 cease, and air mix damper 1 also stops at the fixed angular position in response to the cessation of the rotation of gear 42.

As explained above, when short-circuit switch 447 is closed and short-circuit switch 448 are open, movable contact 441 cycles within a range between the right end portions of fixed contacts 442 and 444 and gap 446. Thus, the driving angle of movable contact 441 and the operating angle of air mix damper 1 are regulated at about $\theta_3$. For example, if the position of movable contact 441, as shown by the broken-line representation in FIG. 4, indicates the passenger compartment air recirculation modes, and movable contact 441 positioned in gap 446 indicates the mixture of outside and inside air mode, motor actuator 4 can alternatively control air mix damper 1, so that the automotive air conditioning system operates in the passenger compartment air recirculation or the mixture of outside and inside air mode.

Further, comparing the stopping positions in gaps 445 and 446 of movable contact 441 in the case of the forward rotation of the drive shaft of motor 41 and gear 42 with the stopping positions in gaps 445 and 446 of movable contact 441 in the case of the reverse rotation of the drive shaft of motor 41 and gear 42, there is the difference of D (the width of movable contact 441)-L (the width of gap 445 and 446) between these stopping positions. Nevertheless, the difference of the operating angles of air mix damper 1 resulting from the difference in the stopping positions of movable contact 441 are small and, for all practical purposes, can practically be ignored for a general automotive air conditioning system. If gaps 445 and 446 are disposed, so that they offset by D-L with respect to each other, the stopping positions in gaps 445 and 446 of movable contact 441 will correspond regardless of the forward and reverse rotations of the drive shaft of motor 41 and gear 42. Accordingly, motor actuator 4 can more exactly regulate the operating angles of air mix damper 1, and the damper position control device in accordance with the above embodiment can add the new operating mode (for example, in this embodiment, the mixture of outside and inside air mode) for an automotive air conditioning system without requiring additional fixed contacts.

Figure 5:
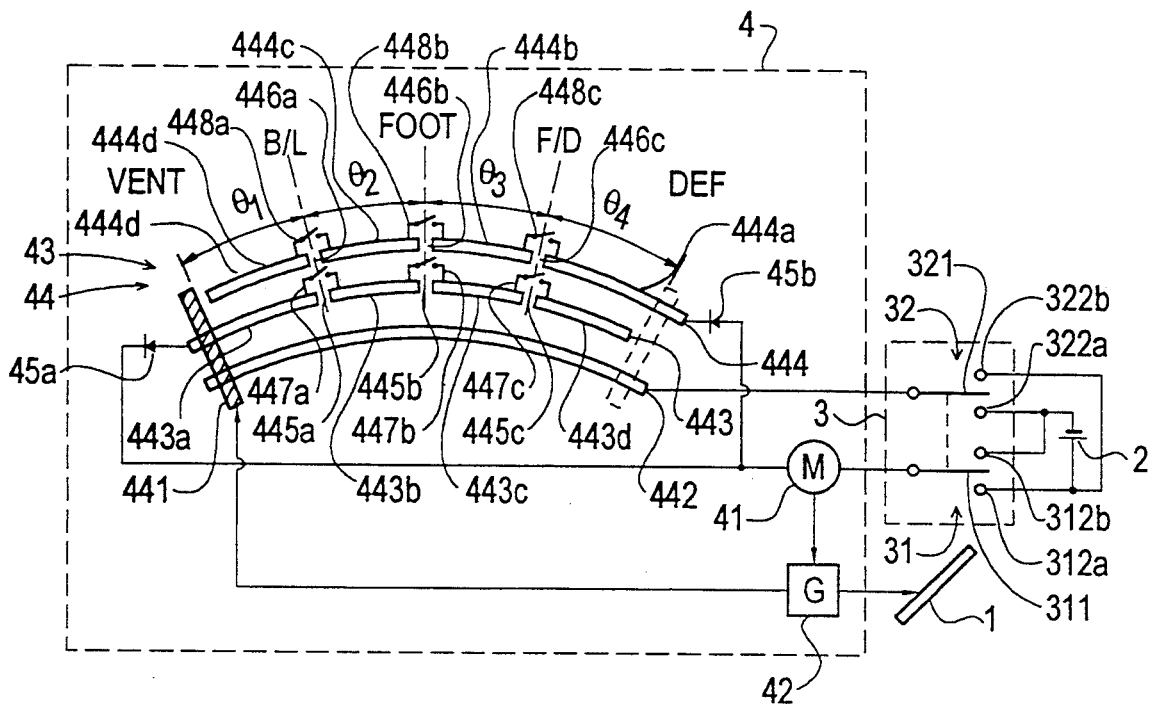
FIG. 5 depicts a schematic view of a damper position control device for use in an automotive air conditioning system in accordance with a third embodiment of this invention.

FIG. 5 depicts a third embodiment of a damper position control device for use in an automotive air conditioning system in accordance with this invention. The same numerals are used in FIG. 5 to denote the corresponding elements depicted in FIGS. 2A and 2B, and, therefore, an explanation thereof is omitted.

Referring to FIG. 5, fixed contacts 443 and 444 are shorter than fixed contact 442, and are disposed, so that they may be offset to the left and right, respectively. Fixed contact 443 is provided with gaps 445a, 445b, and 445c which divide fixed contact 443 into fixed contact segments 443a, 443b, 443c, and 443d. The end portions of segments 443a, 443b, 443c, and 443d are connected to each other by short-circuit switches 447a, 447b, and 447c which respectively short-circuit or isolate the segments on either side of gaps 445a, 445b, and 445c. Fixed contact 444 is provided with gaps 446a, 446b, and 446c which divide fixed contact 444 into fixed contact segments 444a, 444b, 444c, and 444d. The end portions of segments 444a, 444b, 444c, and 444d are connected to each other by short-circuit switches 448a, 448b, and 448c which alternative short-circuit or isolate the segments on either side of gaps 446a, 446b, and 446c. The width of the gaps are smaller than the width of movable contact 441, as shown in FIG. 2B. The upper and lower rotational limits of gear 42 are governed by the connections between fixed contacts 443 and 444 and movable contact 441. The left end portion of fixed contact 443 and the right end portion respectively of fixed contact 444 are coupled with motor 41 through diodes 45a and 45b, each of which has an opposite polarity. Fixed contact 442 is coupled directly with electric power source switch device.

Movable contact 441 can cycle within a range between the left end portions of fixed contacts 442 and 443 and the right end portion of fixed contact 443 by the operation of electric power source switch device 3 in the same way as explained in FIGS. 2A–4. Moreover, motor actuator 4 can regulate the driving angles of movable contact 441, i.e., the operating angles of air mix damper 1, in accordance with the various alignments of short-circuit switches 447a–c and 448a–c in the same way explained with reference to FIGS. 2A–4. The central angle between the left end portion of fixed contact 444 and the central portions of gaps 445a and 446a and is fixed at $\theta_1$, and the central angle between the central angle between the central portions of gaps 445a and 446a and the central portions of gaps 445b and 446b is $\theta_2$. The central angle between the central portions of gaps 445b and 446b and the central portions of gaps 445c and 446c is $\theta_3$. Finally, the central angle between the central portions of gaps 445c and 446c and the right end portion of fixed contact 443 is $\theta_4$. If these central angles $\theta_1$ through $\theta_4$ are determined according to the modes for an automotive air conditioning system, for example, VENT, B/L, FOOT, F/D, and DEF; motor actuator 4 can control air mix damper 1 at optimum operating angles determined according to various operating modes for an automotive air conditioning system.

Although a detailed description of the present invention has been provided above, it is to be understood that the scope of the invention is not to be limited thereby, but is to be determined by the claims which follow.

What is claimed is:

1. In an automotive air conditioning system including a rotatable air mix damper for controlling the mixture of cool air and heated air and, thereby, controlling the temperature of air blown into a passenger compartment by said automotive air conditioning system and a damper position control device for controlling the rotation of said air mix damper; said damper position control device including a motor actuator for rotating said air mix damper in forward and reverse directions, an electric power source, and an electric power source switch device; said motor actuator including a motor and a gear which is operatively connected to a drive shaft of said motor and said air mix damper and which rotates said air mix damper in the forward and reverse directions into a plurality of operating angles; and a rotation control device including a regulator which governs upper and lower rotational limits of the drive shaft of said motor and said gear, said regulator including at least three fixed contacts one of which is longer than the others of said fixed contacts and each of which is parallel to the other fixed contacts and is coupled with said electric power source and said electric power source switch device, and a movable contact which is in contact with at least two of said fixed contacts and which cycles along said fixed contacts in accordance with the rotations of the drive shaft of said motor and said gear and which regulates the operating angles of said air mix damper by contact with said at least two of said fixed contacts, an improvement comprising:

at least one gap disposed at a fixed position in each of said others of said fixed contacts, such that said at least one gap divides said others of said fixed contacts into at least two fixed contact segments; wherein said at least one gap further comprises a short-circuit switch device which, when closed, short-circuits said at least two segments and when open, isolates said segments on either side of said at least one gap.

2. The damper position control device of claim 1 wherein said fixed contacts are arc-shaped.

3. The damper position control device of claim 2 wherein said movable contact has a width and wherein said at least one gap has a width less than the width of said movable contact.

4. The damper position control device of claim 1 wherein said movable contact has a width and wherein said at least one gap has a width less than the width of said movable contact.

5. The damper position control device of claim 1 wherein said at least one gap is disposed at a position in said others of said fixed contacts determined by the plurality of operating angles which correspond to a plurality of operating modes for said air conditioning system.

6. The damper position control device of claim 5 wherein said others of said fixed contacts have sufficient gaps to define the plurality of operating modes for said automotive air conditioning system.

7. The damper position control device of claim 6, wherein said short-circuit switch devices are selectively closed to obtain selected operating modes for said automotive air conditioning system.

8. The damper position control device of claim 6 wherein said gaps are disposed in said others of said fixed contacts, such that said gaps in said parallel fixed contacts are opposite to each other.

9. The damper position control device of claim 8 wherein said short-circuit switch devices are selectively closed to obtain selected operating modes for said automotive air conditioning system.

10. The damper position control device of claim 6 wherein said gaps are disposed in said others of said fixed contacts, such that said gaps in said parallel fixed contacts are offset from each other.

11. The damper position control device of claim 10 wherein said short-circuit switch devices are selectively closed to obtain selected operating modes for said automotive air conditioning system.

12. The damper position control device of claim 1 wherein said short-circuit switch devices are selectively closed to obtain selected operating modes for said automotive air conditioning system.

13. The damper position control device of claim 1 wherein said gaps are disposed in said others of said fixed contacts, such that gaps in said parallel fixed contacts are opposite to each other.

14. The damper position control device of claim 1 wherein said gaps are disposed in said others of said fixed contacts, such that said gaps in said parallel fixed contacts are offset from each other.

* * * * *